(12) United States Patent
Chen et al.

(10) Patent No.: US 10,262,185 B2
(45) Date of Patent: Apr. 16, 2019

(54) IMAGE PROCESSING METHOD AND IMAGE PROCESSING SYSTEM

(71) Applicant: AU Optronics Corporation, Hsin-Chu (TW)

(72) Inventors: Po-Ching Chen, Hsin-Chu (TW); Cheng-Hsiang Ho, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 13 days.

(21) Appl. No.: 15/581,247

(22) Filed: Apr. 28, 2017

(65) Prior Publication Data

US 2017/0344794 A1    Nov. 30, 2017

(30) Foreign Application Priority Data

May 30, 2016 (TW) .............................. 105116897 A

(51) Int. Cl.
  *G06K 9/00* (2006.01)
  *G06K 9/46* (2006.01)
  *G06K 9/56* (2006.01)
  *G06K 9/62* (2006.01)

(52) U.S. Cl.
  CPC ..... *G06K 9/00087* (2013.01); *G06K 9/00067* (2013.01); *G06K 9/4642* (2013.01); *G06K 9/56* (2013.01); *G06K 9/6215* (2013.01)

(58) Field of Classification Search
  CPC .... G06K 9/00087; G06K 9/6215; G06K 9/56; G06K 9/4642; G06K 9/00067; G06K 9/00013; G06K 9/2027
  See application file for complete search history.

(56) References Cited

U.S. PATENT DOCUMENTS

| | | | |
|---|---|---|---|
| 6,289,112 B1 | 9/2001 | Jain et al. | |
| 7,876,933 B2 | 1/2011 | Jang et al. | |
| 8,625,861 B2 | 1/2014 | Aggarwal et al. | |
| 2006/0228006 A1 | 10/2006 | Matsumoto et al. | |
| 2007/0253605 A1 | 11/2007 | Maurer et al. | |
| 2008/0101663 A1* | 5/2008 | Lo | G06K 9/0008 382/124 |
| 2008/0298648 A1* | 12/2008 | Lo | G06K 9/00067 382/125 |
| 2014/0294261 A1* | 10/2014 | Abe | G06K 9/00006 382/124 |
| 2016/0275330 A1 | 9/2016 | Zhou et al. | |

FOREIGN PATENT DOCUMENTS

| | | |
|---|---|---|
| CN | 102254173 | 11/2011 |
| TW | 201023055 | 6/2010 |

OTHER PUBLICATIONS

European Patent Office "Office Action" dated Sep. 18, 2017, EPO.
Joseph G. Butler "Automated Fingertip Detection", Computer Sciences Commons, Brigham Young University BYU ScholarsArchive, Apr. 10, 2012, USA.

* cited by examiner

*Primary Examiner* — Phuoc Tran
(74) *Attorney, Agent, or Firm* — WPAT, PC

(57) ABSTRACT

An image processing method includes obtaining a sensed image, wherein the sensed image comprises a pattern; dividing the sensed image into a plurality of blocks; calculating a direction field according to the pattern in each of the blocks; calculating a similarity degree between the direction field of a first block and the direction fields of adjacent blocks of the first block; and classifying the first block into a first part according to the similarity degree of the first block.

11 Claims, 12 Drawing Sheets

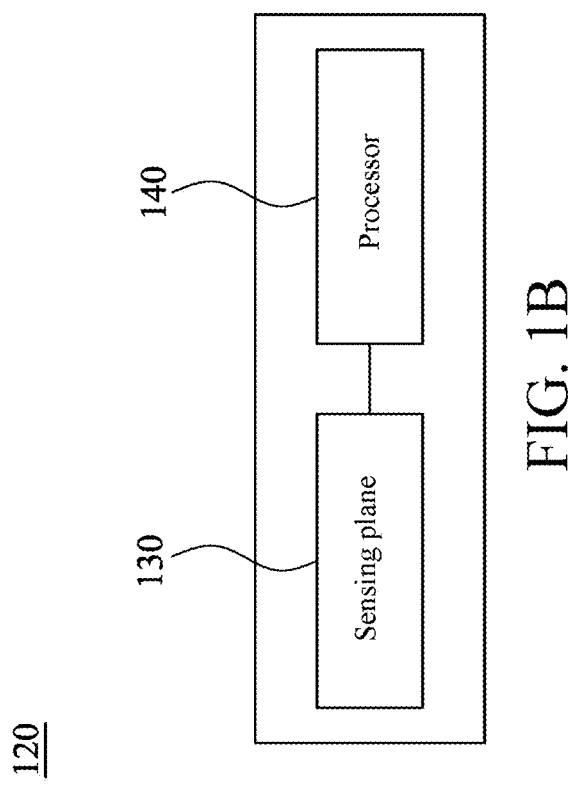

IMAGE PROCESSING METHOD AND IMAGE PROCESSING SYSTEM

BACKGROUND

Technical Field

The present disclosure relates to an image processing technology, and in particular, to a fingerprint image processing technology.

Related Art

The fingerprint identification is a conventional technology and is widely applied to various fields related to data protection or identity identification. Moreover, how to improve identification accuracy and speed up identification is one of the current important research and development subjects.

Because users have different preferences and habits in terms of the manner of pressing a finger on a fingerprint sensing apparatus, the sensing apparatus may receive noise, such as a palm print, a knuckle print, and a shadow, other than a fingerprint, where a sensing apparatus having a sensing plane of a large area, such as a fingerprint identifying apparatus used by the customs, is most likely to be affected. Moreover, such noise will reduce a fingerprint identification rate and increase the time needed for identification. In addition, dust, a water droplet, or other external noise may touch the sensing apparatus mistakenly or affect sensing of the fingerprint, resulting in energy consumption or reduction of an identification success rate.

Convention approaches of filtering out noise from a fingerprint image include, for example, using relevance between a grayscale change, a gradient change, or a direction field of the fingerprint image and texture, and calculating a number of feature points. However, such approaches cannot filter out noise having lines such as a palm print or text, and when the fingerprint image is not sharp enough, it would be easy to cause a misjudgment of an identification result.

SUMMARY

According to a technical aspect of the present disclosure, an image processing method is proposed. The image processing method includes obtaining a sensed image that includes a pattern; dividing the sensed image that includes the pattern into a plurality of blocks; calculating a direction field according to the pattern included in each of the blocks; calculating a similarity degree between the direction field of each of the blocks and at least one adjacent block; and classifying the blocks into a first part and a second part according to the similarity degree of each of the blocks.

According to a technical aspect of the present disclosure, an image processing system is proposed. The image processing system includes a sensing unit and a processor. The sensing unit may be configured to receive a sensed image, where the sensed image includes a pattern. The processor may be configured to perform the following actions: dividing the sensed image that includes the pattern into a plurality of blocks; calculating a direction field according to the pattern included in each of the blocks; calculating a similarity degree between the direction field of each of the blocks and at least one adjacent block; and classifying the blocks into a first part and a second part according to the similarity degree of each of the blocks.

BRIEF DESCRIPTION OF THE DRAWINGS

FIG. 1B is a schematic diagram of a system structure according to an embodiment of the present disclosure;

DETAILED DESCRIPTION

Detailed descriptions are provided below by using embodiments with reference to accompanying drawings, but the described specific embodiments are merely used to explain the present invention rather than limit the present invention. Moreover, the descriptions on the structure and operation are not used to limit execution sequences thereof, and any apparatus generated from a structure reconstituted by components and having an equivalent effect falls within the scope covered by the disclosure of the present invention. In addition, the accompanying drawings are merely used for illustrative description and are not drawn according to real sizes thereof.

Figure 1A:
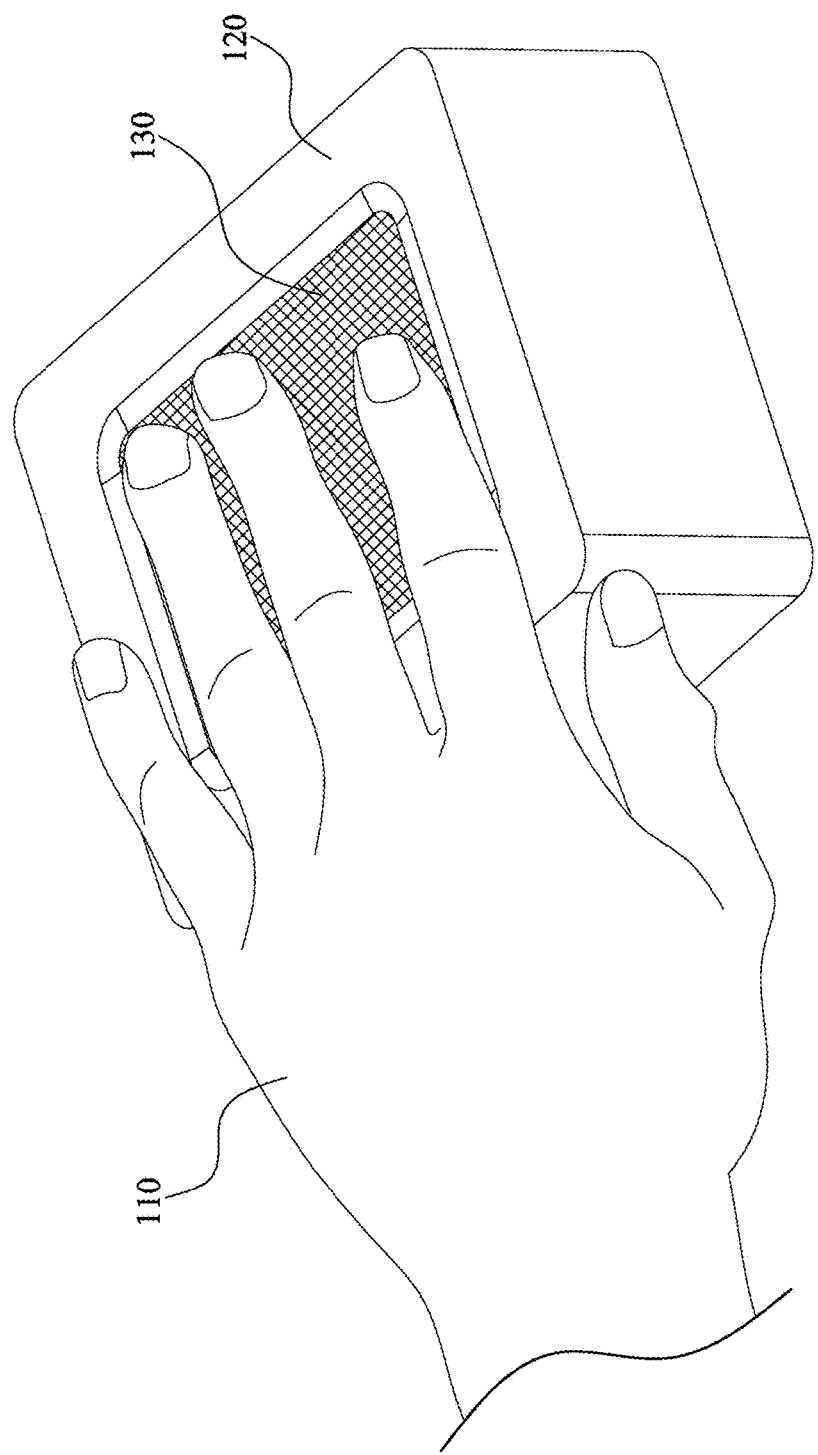
FIG. 1A is a schematic diagram of fingerprint sensing according to an embodiment of the present disclosure.

Please refer to FIG. 1A, which shows a schematic diagram of fingerprint sensing according to an embodiment of the present disclosure. In the present disclosure, a sensing unit 120 may be an image capturing device of a large area including a sensing plane 130 configured to receive an image of at least one finger. FIG. 1A shows a schematic diagram in which a sensing unit 100 simultaneously receives images of three fingers of a hand 110 of a user and simultaneously performs image processing and identification procedures on the three fingers. It should be noted that the sensing unit 120 may use a sensing plane of a different area size according to an actual demand to simultaneously receive more or fewer finger images. In addition, an image captured by the sensing unit 120 may be a grayscale image or a further processed grayscale image. To make the description clear and understandable, an image of one finger is used as an example for detailed description below.

FIG. 1B shows a schematic diagram of a system structure of a sensing unit 120 according to an embodiment of the present disclosure. The sensing unit 120 includes a sensing plane 130 and a processor 140. The sensing plane 130 may be a capacitive or optical sensor, configured to receive a finger press image of a user. The processor 140 performs in advance image processing and finger identification for the finger press image received by the sensing plane 130. For example, an image processing procedure performed by the processor 140 may include processes such as distinguishing between a press region and a non-press region, image enhancement, filtering out noise, binarization, thinning, and capturing features. An effect of filtering out noise has an important impact on a fingerprint identification success rate and a fingerprint identification speed.

Figure 2:
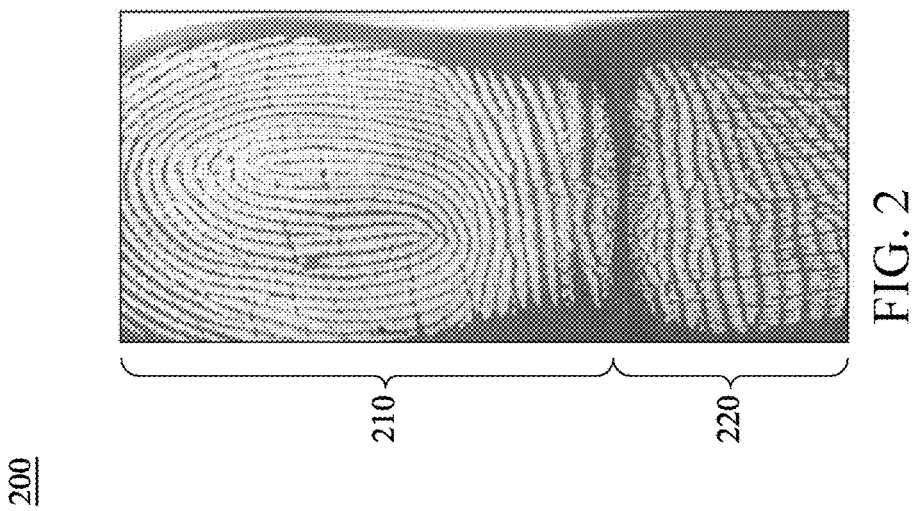
FIG. 2 is a captured image according to an embodiment of the present disclosure.

Please refer to FIG. 2, which shows a captured finger image 200 according to an embodiment of the present disclosure. Because a sensing plane 130 of a relatively large area is used, the finger image 200 may, for example, include a fingerprint 210, a knuckle print 220, and a shadow, and the like. The fingerprint 210 is a target that a system intends to identify, and the knuckle print 220 and shadow or other images that are unnecessary in the fingerprint identification procedure are so-called noise in the present disclosure.

Because noise may include stripes or lines similar to a fingerprint, and if the noise is not filtered out in advance, the noise may be mistakenly judged as a part of a target fingerprint. Pre-processing steps before filtering out the noise disclosed in the present disclosure may include processes such as image division, vector field calculation, similarity degree determination, and/or classification. The process of filtering out the noise is further described below.

Figure 3B:
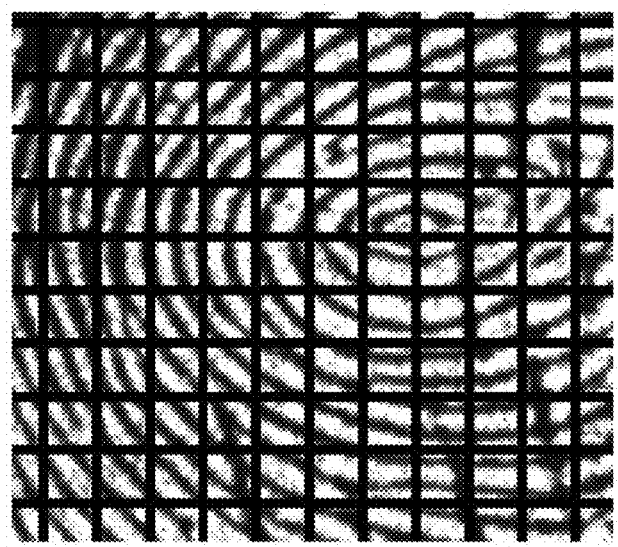
FIG. 3A and FIG. 3B are schematic diagrams of image division according to an embodiment of the present disclosure.
Figure 3A:

FIG. 3A and FIG. 3B are schematic diagrams of image division according to an embodiment of the present disclosure. FIG. 3A is a schematic diagram of a to-be-processed finger image, in which a white stripe is a ridge (or referred to as a ridge line), and a black stripe is a valley (or referred to as a valley line). The processor 140 may divide the image of FIG. 3A into a plurality of blocks. To enable each block to cover at least a ridge and a valley to facilitate subsequent processing, the foregoing block may be divided into a proper size, when the size is excessively small, the block may be unable to cover a ridge and a valley at the same time, and when the size is excessively large, the block may cover multiple lines that have different directions at the same time and reduce the resolution. In an embodiment, the size of the divided block may be set to be at least or preferably a size of 16 pixels*16 pixels or another proper size, thereby enabling each block to cover at least a ridge and a valley.

Figure 4:
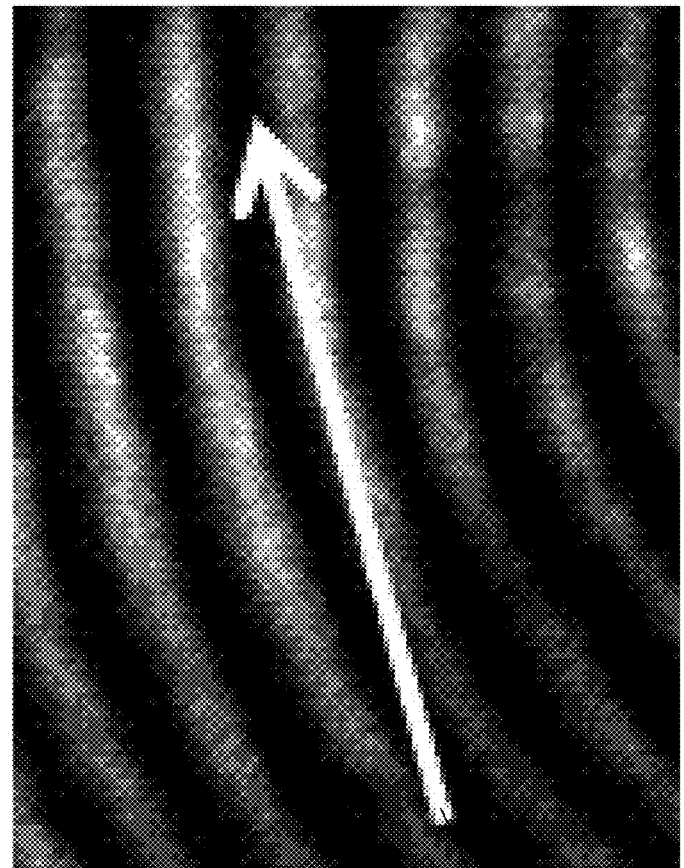
FIG. 4 is a schematic diagram of a direction field according to an embodiment of the present disclosure.

After the image is divided into a plurality of blocks, the processor 140 may further calculate a vector field of an image part included by each block. The vector field is calculated by the processor by using an algorithm. Please refer to FIG. 4, which shows a schematic diagram of a direction field of a fingerprint 400 according to an embodiment of the present disclosure. An arrow 410 indicates the direction field of the image of FIG. 4. In view of FIG. 4, the direction field (the arrow 410) is approximately consistent with the image line. In the present disclosure, the processor 140 performs angle numeralization on the vector field of each block to facilitate further calculation and processing.

Figure 5A:
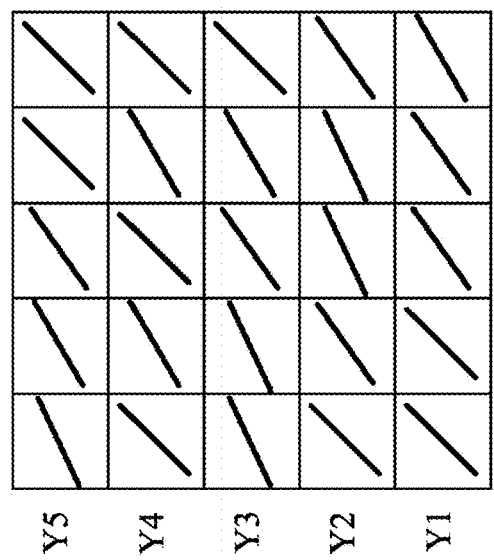
FIG. 5A and FIG. 5B are schematic diagrams of a direction field according to an embodiment of the present disclosure.
Figure 5B:
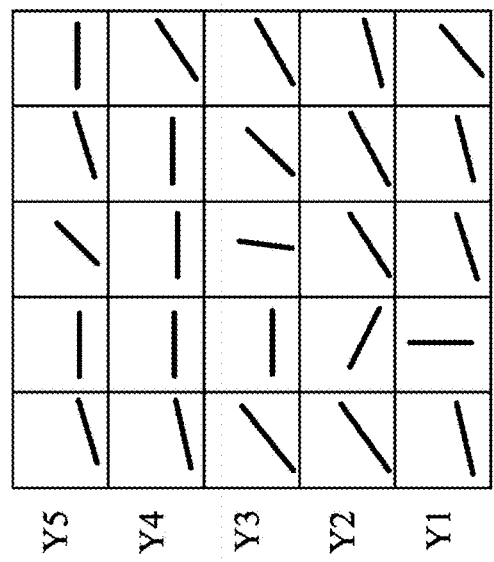

In an embodiment of the present disclosure, the processor 140 further analyzes a similarity degree (consistency) between a vector field of each block and a vector field of an adjacent block thereof. Generally, the fingerprint part has a high similarity degree, while the knuckle print, palm print, or other noise has a low similarity degree. In this embodiment, the system may perform further image processing according to a similarity degree between each block and an adjacent block, so as to determine that each block should belong to the fingerprint or noise. A determining standard for the similarity degree is described by using FIG. 5A and FIG. 5B in the following. FIG. 5A and FIG. 5B show schematic diagrams of a direction field according to an embodiment of the present disclosure. To facilitate description, the image of FIG. 5A and FIG. 5B is divided into 5×5 blocks by using X1 to X5 as horizontal coordinates and Y1 to Y5 as vertical coordinates, and each block is represented by using a coordinate position.

FIG. 5A is a schematic diagram of a vector field of each block in a fingerprint image in a part having a relatively high similarity degree, while FIG. 5B is a schematic diagram of a vector field of each block in a knuckle print image in a part having a relatively low similarity degree. In FIG. 5A and FIG. 5B, a short line in each block presents a direction of a vector field of each block. The processor 140 may calculate an average value of angle differences between an angle of a direction field of each block and angles of direction fields of its adjacent blocks, if the average value is greater than or equal to a preset threshold, indicating that differences between the block and its adjacent blocks are excessively large, a similarity degree is relatively low, and otherwise, the difference is relatively small, and the similarity degree is relatively high.

For example, the number of adjacent blocks may be one or more blocks adjacent to a to-be-determined block or all blocks within a preset distance from the to-be-determined block. In this embodiment, eight surrounding blocks in a matrix with a block as a center are used as adjacent blocks of the block. In addition, a preset threshold may, for example, be set as, but not limited to, 30°, and according to different actual demands, the threshold may be properly adjusted or set. It should be noted that, in this example, the threshold is set according to the average value of angle differences of direction fields, but in terms of application, the similarity degree may be converted into a numeral, and the threshold of the similarity degree may be set according to the numeral.

Comparison angles of direction fields of respective blocks of the fingerprint image in FIG. 5A are shown in Table 1 as follows:

TABLE 1

| Y5 | 30° | 40° | 35° | 45° | 45° |
| Y4 | 45° | 40° | 45° | 40° | 45° |
| Y3 | 30° | 30° | 35° | 40° | 45° |
| Y2 | 45° | 35° | 30° | 30° | 35° |
| Y1 | 45° | 45° | 35° | 35° | 40° |
|    | X1  | X2  | X3  | X4  | X5  |

A block of coordinates (X3, Y3) in FIG. 5A is used as an example, and eight blocks adjacent to this block serve as similarity degree reference blocks of the to-be-determined block of coordinates (X3, Y3), that is, eight blocks located at coordinates (X2, Y2), (X2, Y3), (X2, Y4), (X3, Y4), (X4, Y4), (X4, Y3), (X4, Y2), and (X3, Y2). Angle differences between the block of coordinates (X3, Y3) and the blocks of coordinates (X2, Y2), (X2, Y3), (X2, Y4), (X3, Y4), (X4, Y4), (X4, Y3), (X4, Y2), and (X3, Y2) are sequentially 0°, 5°, 5°, 10°, 5°, 5°, 5°, and 5°, and the average angle difference is:

$$(0°+5°+5°+10°+5°+5°+5°+5°)/8=5°$$

Because the average angle difference 5° is lower than the preset threshold 30°, the system determines that the to-be-determined block of coordinates (X3, Y3) is a block having a high similarity degree.

Comparison angles of direction fields of respective blocks of the knuckle print image in FIG. 5B are shown in Table 2 as follows:

TABLE 2

| Y5 | 10° | 0° | 45° | 10° | 0° |
|----|-----|-----|-----|-----|-----|
| Y4 | 10° | 40° | 10° | 0° | 25° |
| Y3 | 40° | 0° | 90° | 40° | 20° |
| Y2 | 45° | 110° | 30° | 30° | 20° |
| Y1 | 10° | 90° | 10° | 10° | 30° |
|    | X1 | X2 | X3 | X4 | X5 |

A block of coordinates (X3, Y3) in FIG. 5B is used as an example, and eight blocks adjacent to this block serve as similarity degree reference blocks of the to-be-determined block of coordinates (X3, Y3), that is, eights blocks of coordinates (X2, Y2), (X2, Y3), (X2, Y4), (X3, Y4), (X4, Y4), (X4, Y3), (X4, Y2), and (X3, Y2). Angle differences between the block of coordinates (X3, Y3) and the blocks of coordinates (X2, Y2), (X2, Y3), (X2, Y4), (X3, Y4), (X4, Y4), (X4, Y3), (X4, Y2), and (X3, Y2) are sequentially 20°, 90°, 50°, 80°, 90°, 50°, 60°, and 60°, and the average angle difference is:

(20°+90°+50°+80°+90°+50°+60°+60°)/8=62.5°

Because the average angle difference 62.5° is higher than the preset threshold 30°, the system determines that the to-be-determined block of coordinates (X3, Y3) is a block having a low similarity degree.

In an implementation manner of the present disclosure, the processor 140 may classify or mark a block/blocks, having an average angle difference greater than or equal to the threshold (a low similarity degree), as a separate part. And alternatively the processor 140 may also classify or mark a block/blocks, having an average angle difference lower than the threshold (a high similarity degree), as a separate part. Please refer to FIG. 6A to FIG. 6D together, where FIG. 6A to FIG. 6D shows auxiliary illustration diagrams of image processing according to an embodiment of the present disclosure. Table 3 below lists average angle differences corresponding to respective block in FIG. 5B (calculation is performed only to the first decimal place):

TABLE 3

| Y5 | 13.3° | 23° | 32° | 18° | 11.6° |
|----|-------|-----|-----|-----|-------|
| Y4 | 16° | 28° | 25.6° | 30° | 17° |
| Y3 | 29° | 46.8° | 62.5° | 24.4° | 11° |
| Y2 | 39° | 73° | 35° | 16° | 10° |
| Y1 | 71.6° | 57° | 44° | 18° | 10° |
|    | X1 | X2 | X3 | X4 | X5 |

Figure 6B:
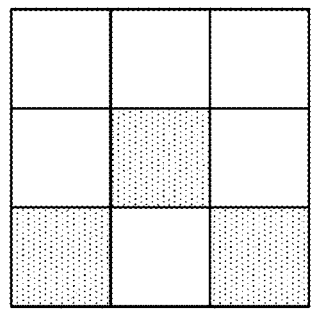
FIG. 6A to FIG. 6D are auxiliary illustration diagrams of image processing according to an embodiment of the present disclosure.
Figure 6A:
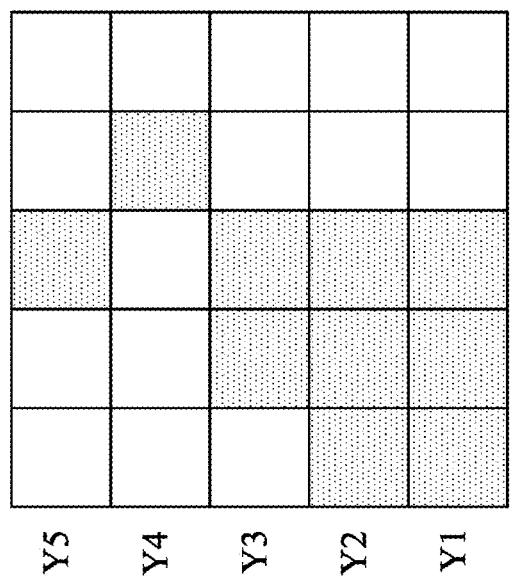

FIG. 6A is an illustrative mark diagram after the respective blocks in the image of FIG. 5B are determined according to the average angle difference in Table 3 by using the threshold of 30° as a reference, where a marked part (for example, the block of coordinates (X1, Y1)) is a block having an average angle difference greater than or equal to the threshold, that is, a block that is classified into the first part (a low similarity degree); and an unmarked blank part (for example, the block of coordinates (X1, Y3)) is a block having an average angle difference lower than the threshold, that is, a block that is classified into the second part (a high similarity degree).

After the first part and second part of the image are distinguished, the processor 140 may further determine proportions of the first part and second part covered by adjacent blocks of each block. The adjacent blocks may be a plurality of blocks adjacent to a to-be-determined block or all blocks within a preset distance from the to-be-determined block. When in the adjacent blocks of the to-be-determined block, the number of blocks belonging to the first part is half of the total number of the adjacent blocks or the number of blocks belonging to the first part is greater than the number of blocks belonging to the second part (that is, when the number of blocks having a low similarity degree is greater than or equal to the number of blocks having a high similarity degree), the to-be-determined block is filtered out, and otherwise, the to-be-determined block is reserved.

In this embodiment, eight surrounding blocks in a matrix with a to-be-determined block as a center are used as adjacent blocks of the to-be-determined block. For example, a block of coordinates (X4, Y4) in FIG. 6A is used as a to-be-determined block. FIG. 6B shows nine blocks in a range between horizontal coordinates X3 and X5 and between vertical coordinates Y3 and Y5 in FIG. 6A, and the to-be-determined block of coordinates (X4, Y4) is located at the center of the nine blocks. Two blocks of the eight blocks surrounding the to-be-determined block of coordinates (X4, Y4) are blocks belonging to the first part (the marked blocks, namely, the blocks of coordinates (X3, Y3) and (X3, Y5)), and the rest six blocks are blocks of the second part (the unmarked blocks). Therefore, in the eight surrounding blocks, the blocks belonging to the first part are fewer than the blocks belonging to the second part. Hence, the to-be-determined block of the central coordinates (X4, Y4) is reserved.

Figure 6D:
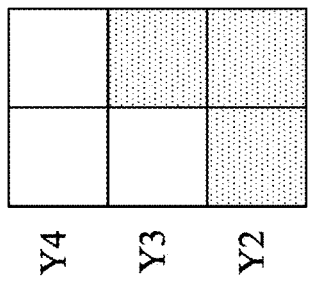
Figure 6C:
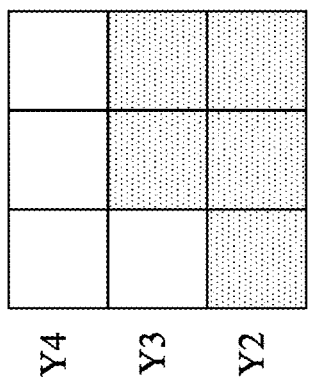

Further, a block of coordinates (X2, Y3) in FIG. 6A is used as a to-be-determined block for description. FIG. 6C shows nine blocks in a range between horizontal coordinates X1 and X3 and between vertical coordinates Y2 and Y4 in FIG. 6A, and the to-be-determined block of coordinates (X2, Y3) is located at the center of the nine blocks. Four blocks of the eight blocks surrounding the to-be-determined block of coordinates (X2, Y3) are blocks belonging to the first part (the marked blocks, namely, the blocks of coordinates (X1, Y2), (X2, Y2), (X3, Y2), and (X3, Y3)), and the rest four blocks are blocks of the second part (the unmarked blocks). Therefore, in the eight surrounding blocks, the blocks belonging to the first part are greater than or equal to the blocks belonging to the second part. Hence, the to-be-determined block of the central coordinates (X2, Y3) is filtered out.

In this embodiment, if a to-be-determined block is located on a boundary of the image, for example, the block of coordinates (X1, Y3) in FIG. 6A, its adjacent blocks are merely five surrounding blocks. FIG. 6D shows six blocks in a range between horizontal coordinates X1 and X2 and between vertical coordinates Y2 and Y4 in FIG. 6A, and the block of coordinates (X1, Y3) is a to-be-determined block. Three blocks of the five blocks surrounding the to-be-determined block of coordinates (X1, Y3) are blocks belonging to the first part (the marked blocks, namely, the blocks of coordinates (X1, Y2), (X2, Y2), and (X2, Y3)), and the rest two blocks are blocks of the second part (the unmarked blocks). Therefore, in the five surrounding blocks, the blocks belonging to the first part are greater than or equal to the blocks belonging to the second part. Hence, the to-be-determined block of coordinates (X1, Y3) is filtered out.

The processor 140 sequentially performs a reserving or filtering-out action on respective blocks according to the foregoing rules. The captured finger image 200 in FIG. 2 is used as a reference image for description in the following. Please refer to FIG. 7A to FIG. 7D together, where FIG. 7A to FIG. 7D show schematic diagrams of an image processing procedure according to an embodiment of the present disclosure. FIG. 7A shows an exemplary image 700 after the captured finger image 200 in FIG. 2 is divided into multiple blocks. It should be noted that the size of a block in the image 700 is not a division size in actual application, but is merely used in an illustrative diagram for auxiliary description. The image 700 includes two parts, namely, a fingerprint 710 and a knuckle print 720, where the fingerprint 710 is a target to be identified, and the knuckle print 720 is noise to be filtered out.

Figure 7B:
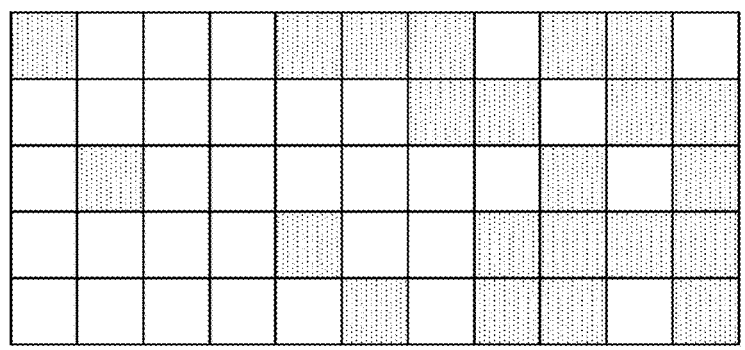
FIG. 7A to FIG. 7D are schematic diagrams of an image processing procedure according to an embodiment of the present disclosure.
Figure 7A:
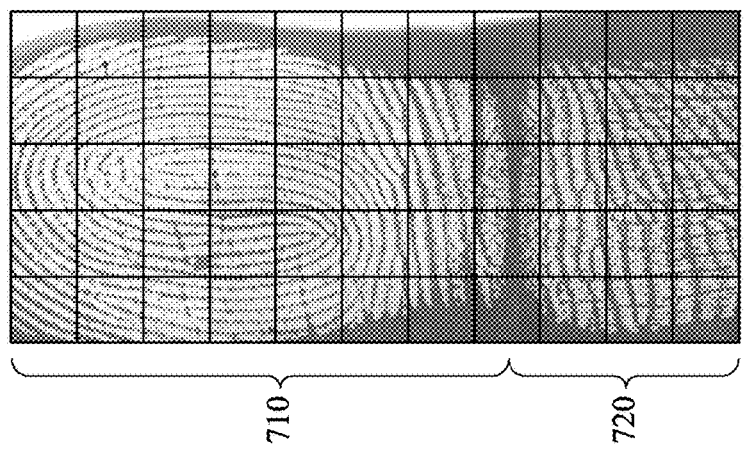
Figure 7D:
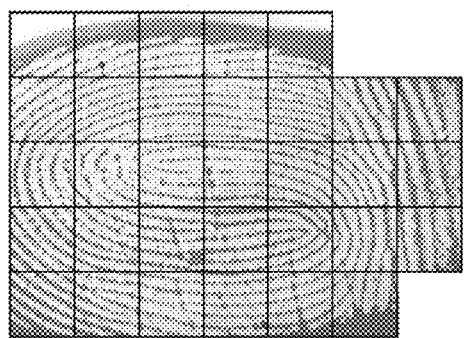
Figure 7C:
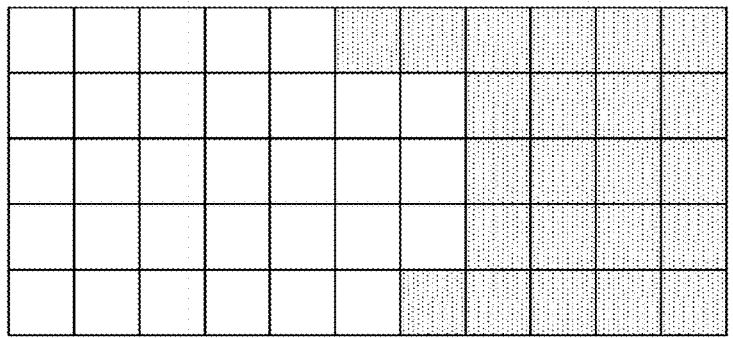

FIG. 7B is an illustrative mark diagram after the respective blocks in the image 700 are subject to vector field calculation, similarity degree determination, and classification, where a marked block belongs to the first part (a block having a low degree of similarity to adjacent blocks), and an unmarked blank block belongs to the second part (a block having a high low degree of similarity to adjacent blocks). According to the filtering-out/reserving rules in FIG. 6A to FIG. 6D, the processor 140 performs further processing on the respective blocks in FIG. 7B to generate FIG. 7C. A final noise filtering-out procedure is performed on the finger image 200 according to FIG. 7C, so as to obtain an image 730 after the noise is filtered out, as shown in FIG. 7D. In the image 730, it could be obviously known that a noise part, such as the knuckle print 720, is filtered out, and only the fingerprint 710 of the identified target is reserved.

Figure 8B:
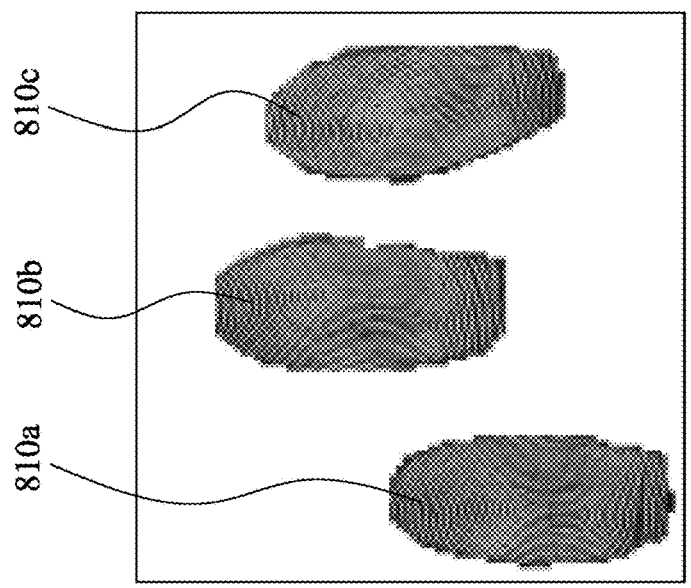
FIG. 8A and FIG. 8B are comparison diagrams before and after image processing according to an embodiment of the present disclosure.
Figure 8A:
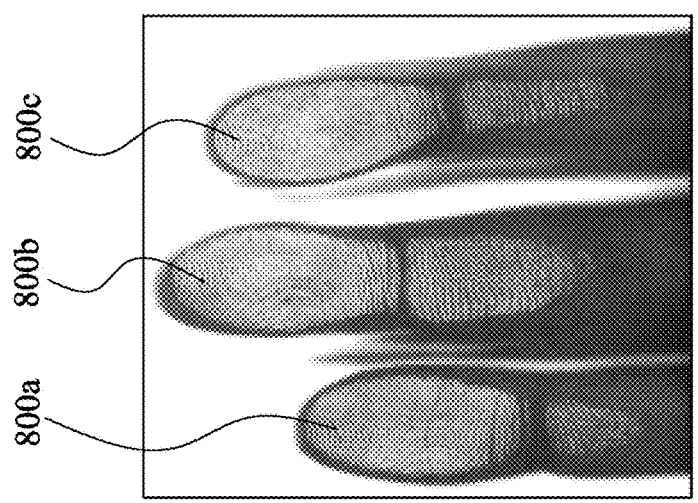

The images that are processed by actually applying the disclosed content of the present disclosure may, for example, be the images of FIG. 8A and FIG. 8B. FIG. 8A and FIG. 8B are comparison diagrams before and after image processing according to an embodiment of the present disclosure. FIG. 8A shows images of three fingers 800a to 800c that are simultaneously received initially, and after image processing disclosed in the present disclosure is performed, noise is effectively filtered out, so that images of fingerprint parts 810a to 810c as shown in FIG. 8B are obtained. As compared with a conventional fingerprint identifying procedure, according to the present disclosure, because the unnecessary noise image part is filtered out in advance, and the system only needs to analyze the target fingerprint part, the fingerprint identifying procedure is faster. In addition, because the noise is effectively filtered out, a fingerprint identification success rate is significantly improved.

Figure 9:
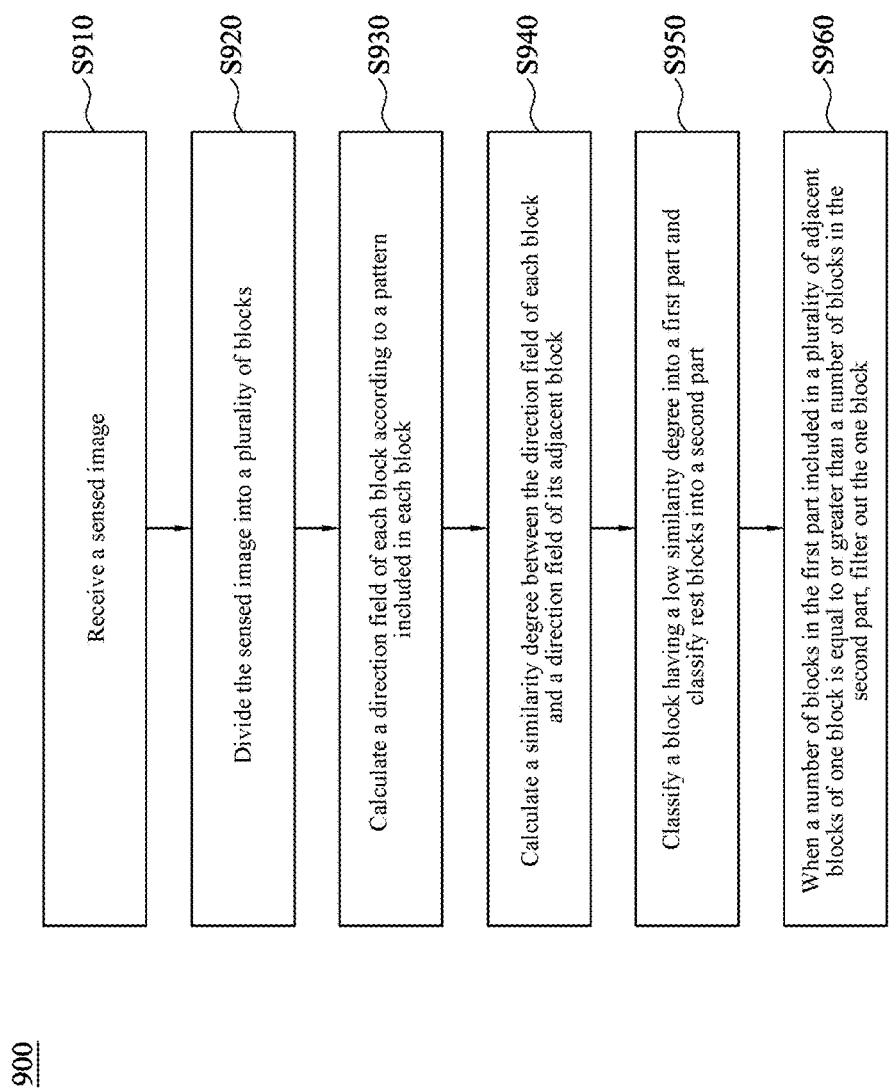
FIG. 9 is a flowchart of a method according to an embodiment of the present disclosure.

Please refer to FIG. 9, which shows a flowchart of a method 900 according to an embodiment of the present disclosure. Firstly, Step S910: Receive input of a sensed image of a finger. Subsequently, Step S920: Divide a sensed region into a plurality of blocks for subsequent processing. Step S930: Calculate a direction field of each block. Step S940: Calculate a similarity degree between the direction field of each block and a direction field of its adjacent block. Step S950: Further, classify a block having a low similarity degree into a first part and classify rest blocks into a second part. Finally, Step S960: When a proportion/number of blocks in the first part included in the adjacent blocks of one block of the blocks is equal to or greater than a proportion/number of blocks in the second part, filter out the one block.

In an implementation manner of the present disclosure, a fingerprint identification system may calculate a direction field and a similarity degree of each block in the image as reference bases for capturing fingerprint features. Fingerprint feature points, such as a line end, a divergent line, and a short line, in the fingerprint image may be determined according to the direction field and similarity degree.

In an implementation manner of the present disclosure, the fingerprint identification system may determine whether an original image includes a fingerprint image according to the image after the image processing. If the system determined that the original image includes a fingerprint image, an identification procedure is further started, and otherwise, it is not started. This mechanism would avoid a misoperation caused by a mistaken touch, a water droplet, or dust, and effectively produce an energy saving effect.

In another implementation manner of the present disclosure, the fingerprint identification system may further distinguish between a fingerprint part and a background part according to the foregoing image processing method. Because a fingerprint boundary may include a false feature point such as a broken line, determining the boundary of the fingerprint by distinguishing between the fingerprint part and the background part and further filtering out a boundary feature point can effectively avoid a situation that a false feature point on the boundary causes a misjudgment, thereby improving an identification rate.

To follow the foregoing implementation manner, the fingerprint identification system may further find out a singular point of the fingerprint, for example, a core and a delta. Because the core is a curved region at the center of the fingerprint and has a low degree of similarity to a surrounding block, a location of the core and the number of cores can be determined. Moreover, according to the numbers of cores and deltas, the fingerprints may be classified into fingerprint types such as an arch type, a tented arch type, a left loop type, a right loop type, and a whorl type. Therefore, the technology disclosed in the present disclosure may provide references for fingerprint types.

Although embodiments of the present invention are disclosed as above, they are not intended to limit the present invention. Any person skilled in the art may make some variations or modifications without departing from the spirit and scope of the present invention. Therefore, the protection scope of the present invention shall be subject to the protection scope of the appended claims.

What is claimed is:

1. An image processing method, comprising:
   obtaining a sensed image, wherein the sensed image comprises a pattern;
   dividing the sensed image into a plurality of blocks;
   calculating a direction field according to the pattern in each of the blocks;
   calculating a similarity degree between the direction field of a first block and the direction fields of adjacent blocks of the first block, wherein the similarity degree of the first block is an average difference between the direction field of said first block and the direction field of each of the adjacent blocks; and
   classifying the first block into a first group according to the similarity degree of the first block when the similarity degree of the first block is lower than a first threshold.

2. The image processing method according to claim 1, wherein the pattern comprised in each of the blocks corresponds to at least one ridge or at least one valley of a fingerprint.

3. The image processing method according to claim 1, wherein the direction field of each of the blocks is calculated according to a grayscale image of each of the blocks.

4. The image processing method according to claim 1, wherein the direction field of the first block is compared with direction fields of eight adjacent blocks in a 3×3 matrix with the first block as a center to obtain the similarity degrees between the first block and the adjacent blocks.

5. The image processing method according to claim 1, wherein the first block is classified into a second group according to the similarity degree of the first block when the similarity degree of the first block is greater than or equal to the first threshold.

6. The image processing method according to claim 1, further comprising:
- calculating similarity degrees for each of adjacent blocks of the first block;
- classifying each of the adjacent blocks into the first group and a second group based on the similarity degrees of each of the adjacent blocks;
- calculating a ratio between a number of the adjacent blocks in the first group and a number of the adjacent blocks in the second group; and
- filtering out the first block when the ratio is below a second threshold.

7. The image processing method according to claim 1, further comprising:
- calculating similarity degrees for each of adjacent blocks of the first block;
- classifying each of the adjacent blocks into the first group and a second group based on the similarity degrees of each of the adjacent blocks;
- calculating a ratio between a number of the adjacent blocks in the first group and a number of the adjacent blocks in the second group; and
- reserving the first block when the ratio is greater than or equal to a second threshold.

8. The image processing method according to claim 1, further comprising:
- capturing a fingerprint feature based on the direction field of each of the blocks.

9. The image processing method according to claim 1, further comprising:
- determining whether a fingerprint exists in the sensed image, and starting fingerprint identification if the fingerprint exists.

10. An image processing system, comprising:
- a sensing unit, for receiving a sensed image, wherein the sensed image comprises a pattern; and
- a processor, for performing the following actions:
  - dividing the sensed image into a plurality of blocks;
  - calculating a direction field according to the pattern in each of the blocks;
  - calculating a similarity degree between the direction field of a first block and the direction fields in adjacent blocks of the first block, wherein the similarity degree of the first block is an average difference between the similarity degree of the first block and the similarity degree of each of the adjacent blocks; and
  - classifying the first block into a first group according to the similarity degree of the first block.

11. An image processing method, comprising:
- obtaining a sensed image, wherein the sensed image comprises a pattern;
- dividing the sensed image into a plurality of blocks;
- calculating a direction field according to the pattern in each of the blocks;
- calculating a similarity degree between the direction field of a first block and the direction fields of adjacent blocks of the first block, wherein the similarity degree of the first block is an average difference between the direction field of said first block and the direction field of each of the adjacent blocks;
- classifying the first block into a first group according to the similarity degree of the first block when the similarity degree of the first block is lower than a first threshold;
- calculating similarity degrees for each of adjacent blocks of the first block;
- classifying each of the adjacent blocks into the first group and a second group based on the similarity degrees of each of the adjacent blocks;
- calculating a ratio between a number of the adjacent blocks in the first group and a number of the adjacent blocks in the second group; and
- filtering out the first block when the ratio is below a second threshold.

\* \* \* \* \*